US008811150B2

(12) United States Patent
Bauchot et al.

(10) Patent No.: US 8,811,150 B2
(45) Date of Patent: Aug. 19, 2014

(54) DYNAMIC ERROR DAMPENING IN A NETWORK SYSTEM

(71) Applicant: International Business Machines Corporation, Armonk, NC (US)

(72) Inventors: Frederic Bauchot, Saint-Jeannet (FR); Lionel Denecheau, La Colle sur Loup (FR); Ludovic Hazard, Tourrettes sur Loup (FR); Stephen Sauer, La Defense (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/783,458

(22) Filed: Mar. 4, 2013

(65) Prior Publication Data

US 2013/0176842 A1    Jul. 11, 2013

Related U.S. Application Data

(63) Continuation of application No. 12/953,559, filed on Nov. 24, 2010, now Pat. No. 8,422,358.

(51) Int. Cl.
| | |
|---|---|
| *H04L 12/703* | (2013.01) |
| *H04L 12/707* | (2013.01) |
| *H04L 29/14* | (2006.01) |
| *H04L 12/701* | (2013.01) |
| *H04L 12/24* | (2006.01) |
| *H04L 12/56* | (2006.01) |

(52) U.S. Cl.
CPC ............... *H04L 45/28* (2013.01); *H04L 45/22* (2013.01); *H04L 29/14* (2013.01); *H04L 45/00* (2013.01); *H04L 12/2422* (2013.01)
USPC ........................................................ 370/216

(58) Field of Classification Search
CPC ......... H04L 45/28; H04L 45/22; H04L 29/14; H04L 45/00; H04L 12/2422
See application file for complete search history.

(56) References Cited

U.S. PATENT DOCUMENTS 5,461,609 A     10/1995  Pepper
6,678,283 B1 *   1/2004  Teplitsky ..................... 370/463
(Continued)

OTHER PUBLICATIONS

Application No. PCT/EP2011/070713, International Search Report and the Written Opinion of the International Searching Authority, or the Declaration mail date Jan. 16, 2012, 12 pages.

(Continued)

*Primary Examiner* — Andrew Lai
*Assistant Examiner* — Hoyet H Andrews
(74) *Attorney, Agent, or Firm* — Shmeiser, Olsen & Watts, LLP; John Pivnichny

(57)  ABSTRACT

A method and computer system for dynamic error dampening in a node of a network system. Data traffic of the node is implemented in accordance with an Open Systems Interconnection (OSI) network management model that includes a Layer 1 physical link, a Layer 2 link including a data link in which primitive point-to-point data communication with neighboring nodes is enabled upon the Layer 1 physical link, and a Layer 3 link which is a network link operating on top of the Layer 2 link. Implementation of an error dampening process at the node includes deactivating the Layer 3 link of the node while monitoring data traffic over the Layer 2 link of the node. Deactivating the Layer 3 link of the node includes preventing the Layer 3 Link of the node from receiving incoming data traffic for routing to other nodes in the network system.

20 Claims, 8 Drawing Sheets

(56) References Cited

U.S. PATENT DOCUMENTS

| | | | |
|---|---|---|---|
| 8,170,043 B2* | 5/2012 | On et al. | 370/419 |
| 8,351,325 B2* | 1/2013 | Hinz et al. | 370/218 |
| 8,493,974 B1* | 7/2013 | Nelson et al. | 370/389 |
| 2002/0012345 A1* | 1/2002 | Kalkunte et al. | 370/389 |
| 2004/0090918 A1 | 5/2004 | McLendon | |
| 2005/0249123 A1 | 11/2005 | Finn | |
| 2006/0171404 A1 | 8/2006 | Nalawade et al. | |
| 2008/0113652 A1* | 5/2008 | Liu | 455/414.1 |
| 2009/0003243 A1 | 1/2009 | Vaswani et al. | |
| 2010/0293233 A1* | 11/2010 | Salam et al. | 709/206 |
| 2011/0222538 A1* | 9/2011 | Singh et al. | 370/392 |
| 2012/0127850 A1 | 5/2012 | Bauchot et al. | |
| 2012/0195316 A1* | 8/2012 | Madathilparambil George et al. | 370/392 |
| 2012/0243548 A1* | 9/2012 | On et al. | 370/401 |

OTHER PUBLICATIONS

Zhang et al.; Timer Interaction in Route Flap Damping, Distributed Computing Systems, 2005, ICDCS 2005. 25th IEEE International Conference; Jun. 6-10, 2005; 11 pages.

Villamizar et al.; BGP Route Flap Damping; Network Working Group Request for Comments 2439; The Internet Society; Nov. 1998; retrieved from the Internet Jan. 31, 2012; ftp://ftp.ietf.org/rfc/rfc2439.txt; 32 pages.

Solie et al. BGP Route Dampening. InformIT: CCIE Practical Studies, vol. II. [line]. 11 pages. [retrieved on Jul. 7, 2009]. Retrieved from the Internet< URL: http://www.informit.com/library/content.aspx?b=CCIE_Practical_Studies_II&seqNum=107>.

Notice of Allowance (Mail Date Dec. 18, 2012) for U.S. Appl. No. 12/953,559, filed Nov. 24, 2010.

* cited by examiner

```
L101:    NbErrIn(T1) = Poll Total number Errors In
L102:    NbPacketsIn(T1) = Poll Total number Packets In
L103:    NbErrOut(T1) = Poll Total number Errors Out
L104:    NbPacketsOut(T1) = Poll Total number Errors Out L105:    NbErrorIN = NbErrIn(T1)-NbErrIn(T0)
L106:    NbPacketsIN = NbPacketsIn(T1)-NbPacketsIn(T0)
L107:    NbErrorOUT = NbErrOut(T1)-NbErrOut(T0)
L108:    NbPacketsOUT = NbPacketsOut(T1)-NbPacketsOut(T0)

L109:    ErrorRatioIN = NbErrorIN/(NbPacketsIN+NbErrorIN)
L110:    ErrorRatioOUT =
                  NbErrorOUT/(NbPacketsOUT+NbErrorOUT)
L111:    ErrorRatio = MAX(ErrorRatioIN, ErrorRatioOUT)

L112:    NbErrIn(T0) = NbErrIn(T1)
L113:    NbPacketsIn(T0) = NbPacketsIn(T1)
L114:    NbErrOut(T0) = NbErrOut(T1)
L115:    NbPacketsOut(T0) = NbPacketsOut(T1)

L116:    If ErrorRatio ≤ 1%, Reliability = 100%
L117:        Then Penalty = 0
L118:    Else
L119:        Case ErrorRatio > 1%, Reliability = 50%
L120:        Case ErrorRatio > 5%, Reliability = 10%
L121:        Case ErrorRatio > 10%, Reliability = 0%

L122:        Send Notification AlarmLinkError
L123:        Start ChildProcess ErrorMeasureProtocol
L124:        Start ErrorDampening()
```

FIG. 4

```
L201:    Function ErrorDampening()

L202:    MaxPenalty: Configurable
L203:    minPenalty = 0

L204:    Penalty = MaxPenalty*(1-Reliability)

L205:    DampeningErrorSuppressThreshold = 75% MaxPenalty
L206:    DampeningErrorReuseThreshold = 25% MaxPenalty L207:    MaxTimePenalty = TimeInterval*MaxPenalty
L208:    TimePenalty = Time Interval*Penalty*Coefficient L209:    If Penalty > DampeningErrorSuppressThreshold
L210:       Then
L211:              Interface LAYER 3 Down for routing protocols
L212:              Send Notification LinkL3Down
L213:    Else if Penalty < DampeningErrorReuseThreshold
L214:       Then
L215:              Interface LAYER 3 up for routing protocols
L216:              Send Notification LinkL3Up
L217:              If Penalty >0
L218:                 Then Penalty = Penalty *(1- Reliability)
L219:              Else
L220:                     Penalty = minPenalty L221:    If Penalty = 0
L222:         Then
L223:              Stop ChildProcess ErrorMeasureProtocol
L224:              Send Notification ClearAlarmLinkError L225:    EndFunction ErrorDampening()
```

FIG. 5

```
L301:   Process ErrorMeasureProtocol

L302:   Bypass Routing Table
L303:   Send packet to neighbor each X ms
L304:   Report Errors
```

FIG. 6

DYNAMIC ERROR DAMPENING IN A NETWORK SYSTEM

This application is a continuation application claiming priority to Ser. No. 12/953,559, filed Nov. 24, 2010, now U.S. Pat. No. 8,422,358, issued Apr. 16, 2013.

BACKGROUND

In conventional network management, a router employs an interface in a communication path, or a route, when the interface is stable. If the interface rapidly changes its link state to and from up and down within a short period of time, the interface is referred to as "flapping," and the flapping interface sends out an excessive amount of route adjust messages. The router dampens the flapping interface by filtering out the route adjust messages from the flapping interface, and does not employ the dampened interface in further routing. Consequently, the interface is either up or down, and an error rate of the interface is not evaluated in conventional network management.

BRIEF SUMMARY

According to one embodiment of the present invention, a method for dynamic error dampening in a node in a network system having a management node comprises: retrieving statistics of data traffic of the node, wherein said statistics comprises a number of total incoming packets (INt), a number of erred incoming packets (INe), a number of total outgoing packets (OUTt), and a number of erred outgoing packets (OUTe), wherein the node comprises a link error Management Information Base (MIB); calculating Error ratio value (E) and Reliability value (R) of the link error MIB based on said statistics from said retrieving, wherein $0 \leq R \leq 1$; determining that the Error ratio value (E) is greater than Threshold, and subsequently starting an error measure protocol for monitoring the data traffic over Layer 2 link of the node and calculating Penalty value (P) of the node as (MaxPenalty*(1−R)), wherein MaxPenalty is a preconfigured upper bound of the Penalty value (P); and ascertaining that the Penalty value (P) from said initializing falls in a range selected from the group consisting of a first range wherein (Suppress Threshold (ST) <P), a second range wherein (Reuse Threshold (RT)<P≤ST), a third range wherein (0<P≤RT), and a fourth range wherein (P=0), wherein the first range is associated with recalculating the Penalty value (P) as (P*(1−R)), and deactivating Layer 3 link of the node, wherein the second range is associated with continuing of transferring the data traffic, wherein the third range is associated with said recalculating and reactivating the Layer 3 link of the node, and wherein the fourth range is associated with said reactivating and resetting of monitoring the Error ratio value (E).

According to one embodiment of the present invention, a computer program product comprises a computer readable memory unit that embodies a computer readable program code. The computer readable program code contains instructions that, when run by a processor of a computer system, implement a method for dynamic error dampening in a node in a network system having a management node.

According to one embodiment of the present invention, a computer system comprises a processor, a memory coupled to the processor, and a computer readable storage device coupled to the processor, said storage device containing program code configured to be executed by the processor via the memory to implement a method for dynamic error dampening in a node in a network system having a management node.

According to one embodiment of the present invention, a process for supporting computer infrastructure, said process comprising providing at least one support service for at least one of creating, integrating, hosting, maintaining, and deploying computer-readable code in a computing system, wherein the code in combination with the computing system is capable of performing a method for dynamic error dampening in a node in a network system having a management node.

BRIEF DESCRIPTION OF THE SEVERAL VIEWS OF THE DRAWINGS

FIGS. 4, 5, and 6 illustrate an embodiment of the system for dynamic routing based on reliability evaluation of FIG. 1.

DETAILED DESCRIPTION

Figure 1:
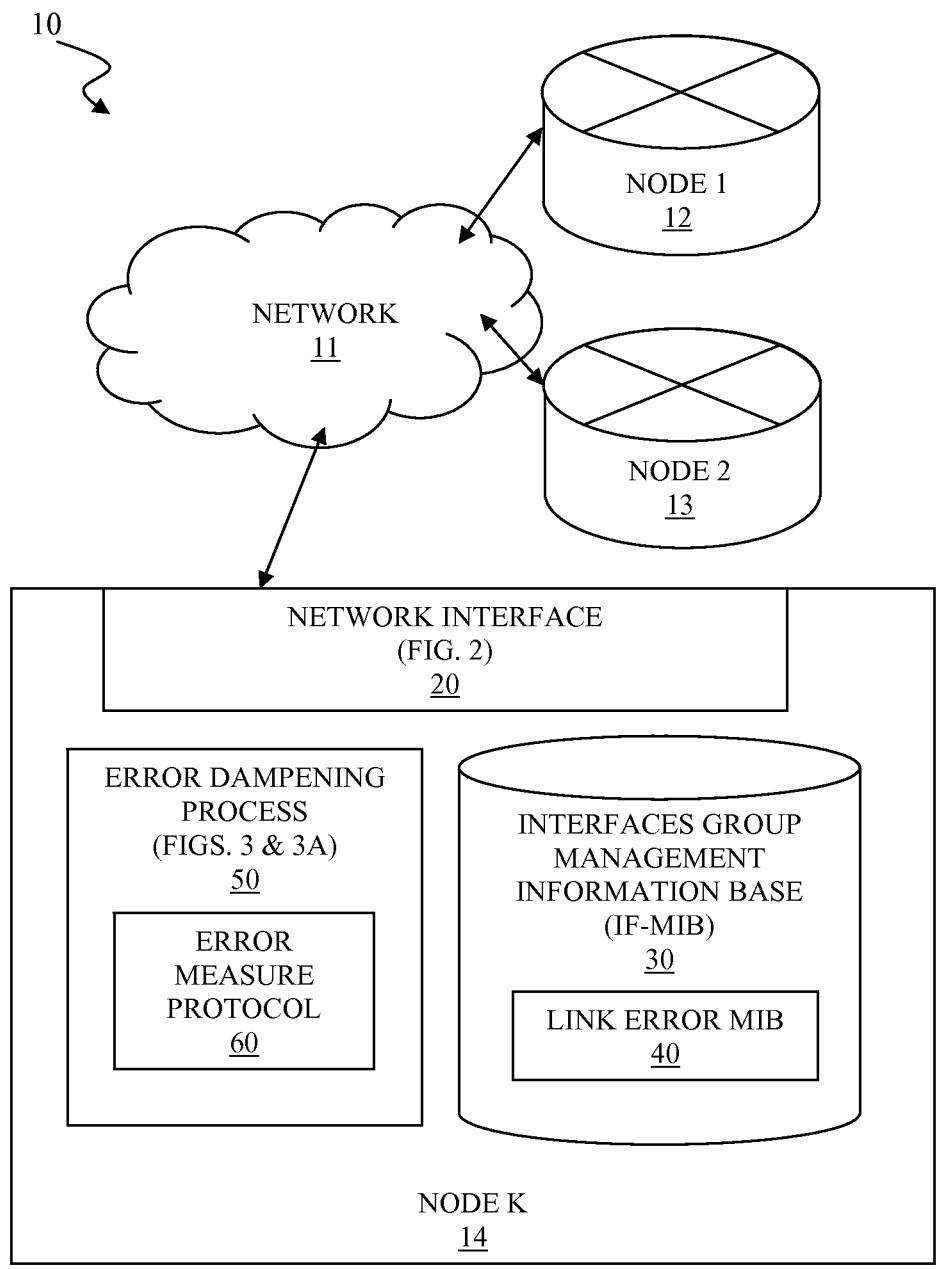
FIG. 1 illustrates a system for dynamic routing based on evaluation of network interface reliability, in accordance with embodiments of the present invention.

FIG. 1 illustrates a system 10 for dynamic routing based on evaluation of network interface reliability, in accordance with embodiments of the present invention.

The system 10 comprises at least two nodes that are interconnected via a network 11. The network 11 is a digital communication network such as Internet. In this specification, the term "node" is defined as a communication entity with routing capability, that is, a router.

Node K 14 of said at least two nodes represents a typical node in the system 10 that communicates with another node of said at least two nodes. All nodes in the system 10, Node 1 12, Node 2 13, and Node K 14, comprise functionally identical and/or compatible processing components such that any two nodes can communicate with each other through the network 11. Node K 14 comprises a network interface 20, an Interface Group Management Information Base (IF-MIB) 30, and an error dampening process 50.

The network interface 20 is an interface of Node K 14 to and from the network 14. The network interface 20 comprises multiple layers distinguished by a respective functionality of each layer. In this specification, layers of the network interface 20 are referred to in the context of the Open Systems Interconnection (OSI) Network Management Model, which is often referred to as simply "OSI model." The OSI model consists of seven (7) layers respectively representing specific requirements on top of layers below each layer. Accordingly, a layer 2 (L2) link indicates a data link of the OSI model, in which primitive point-to-point data communication with neighboring nodes is enabled upon a layer 1 (L1) physical link. Layer 3 (L3) link indicates a network link of the OSI model that operates on top of a L2 data link. In this specification, a routing protocol operates in L3 network link level in accordance with context of the OSI model. Consequently, when L3 link in the network interface 20 of Node K 14 is deactivated by the error dampening process 50, Node K 14 cannot route any data traffic but can transmit and receive data over L2 link. See description of FIG. 2, infra, for steps performed by the network interface 20. Also see FIG. 4, infra, for an example of a process of the network interface 20.

The Interface Group Management Information Base (IF-MIB) 30 is described in the Request for Comments (RFC) 2863 published by the Internet Engineering Task Force (IETF). In this specification, the term "Management Information Base" or simply "MIB" is defined as a functional subset of a virtual database and accompanying process modules used for managing a communicating entity in a digital communications network, in context of the OSI model. The IF-MIB 30 comprises a MIB extension referred to as a link error MIB 40.

The link error MIB 40 is created as a part of the IF-MIB 30 that is local to Node K 14 to support functionalities of the error dampening process 50. The link error MIB 40 comprises data objects of Error ratio and Reliability to hold network management information. Error ratio of the link error MIB 40 holds information on rate of failed amount of data traffic out of entire amount of data traffic attempted for transfer. Reliability of the link error MIB 40 is configured by an administrator of Node K 14 in reverse relation to the value of Error ratio. The link error MIB 40 is used to generate notification events on L3 link state to a management node of the system 10 when Error ratio exceeds Threshold configured in the error dampening process 50 and when Error ratio becomes less than Reuse Threshold. The event notification modules are created by compiling the link error MIB 40 with conventional MIB compilers available in the industry, and are not described in this specification. See descriptions of FIG. 3 infra for details of Error ratio calculation and notification events.

The error dampening process 50 monitors an error ratio of the network interface 20, calculates a penalty of the network interface, and deactivates/activates Layer 3 (L3) link of the network interface 20 based on a value of the penalty. See description of FIGS. 3 & 3A, infra, for steps performed by the error dampening process 50. Also see FIG. 5, infra, for an example of the error dampening process 50.

The error dampening process 50 comprises an error measure protocol 60. The error measure protocol 60 operates on Layer 2 (L2) link of the network interface 20 to check the L2 link status of the network interface 50 while the L3 link is deactivated by the error dampening process 50. See FIG. 6, infra, for an example of the error measure protocol 60.

Node K 14 of the system 10 outperforms conventional routers by monitoring L2 link even when L3 link of the network interface 20 does not route any data traffic after being deactivated due to high error ratio. Gathered management information on L2 link and L3 link of the network interface 20 are stored in the link error MIB 40 and propagated to a management node and other nodes in the system 10 to reroute the data traffic onto more reliable nodes.

Figure 2:
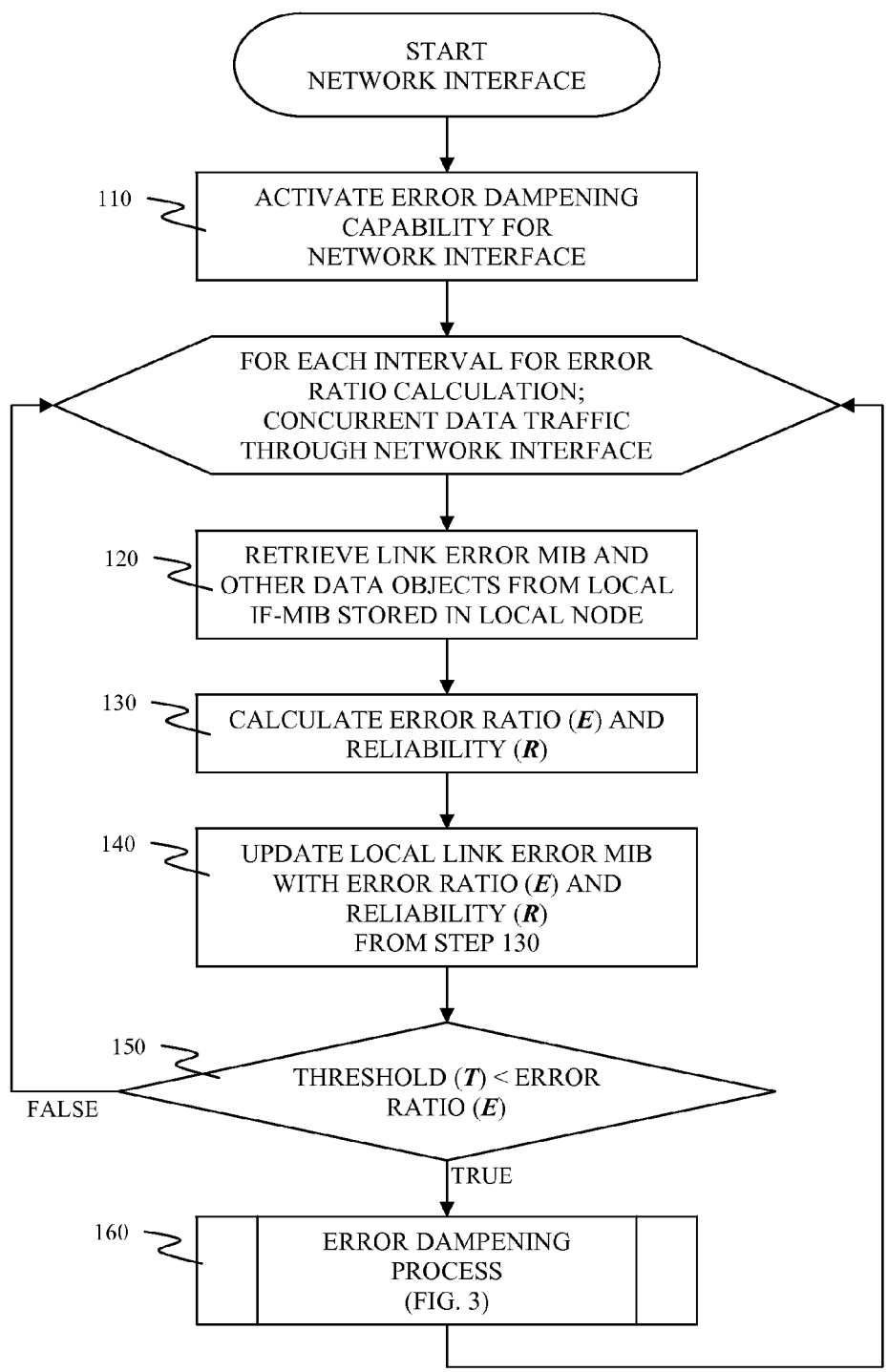
FIG. 2 is a flowchart depicting a method for dynamically suppressing errors in the network interface of the system of FIG. 1, in accordance with the embodiments of the present invention.

FIG. 2 is a flowchart depicting a method for dynamic error dampening as performed by a network interface of Node K of FIG. 1, supra, in accordance with the embodiments of the present invention.

In step 110, the network interface activates error dampening capability for the network interface. The network interface proceeds with step 120.

Steps 120, 130, 140, 150, and 160 are performed as a loop for each interval pre-configured for Error ratio (E) calculation while the network interface is operating. The network interface concurrently transfers data traffic while performing steps 120 through 160.

In step 120, the network interface retrieves the Interface Group Management Information Base (IF-MIB) comprising the link error MIB (LE) from a storage device of the local node. The network interface proceeds with step 130.

In step 130, the network interface calculates Error ratio (E) and Reliability (R) of the link error MIB (LE) from step 120 according to preconfigured formula. See descriptions of FIG. 4 infra for an example of Error ratio (E) and Reliability (R) calculation. The network interface proceeds with step 130.

In step 140, the network interface updates the link error MIB (LE) content of the local IF-MIB with Error ratio (E) and Reliability (R) calculated from step 130. The network interface proceeds with step 150.

In step 150, the network interface determines if Error ratio (E) calculated in step 130 is greater than Threshold (T) configured in the local node. If the network interface determines that Error ratio (E) is greater than Threshold (T), then the network interface proceeds with step 160. If the network interface determines that Error ratio (E) is less than or equal to Threshold (T), then the network interface loops back to step 120 for next interval for error ratio calculation.

In step 160, the network interface performs the Error dampening process because the network interface suffers from too many errors as determined in step 150. See descriptions of FIG. 3, infra, for details of the Error dampening process. Once the network interface completes the Error dampening process, the network interface loops back to step 120 for next interval for error ratio calculation.

Figure 3:
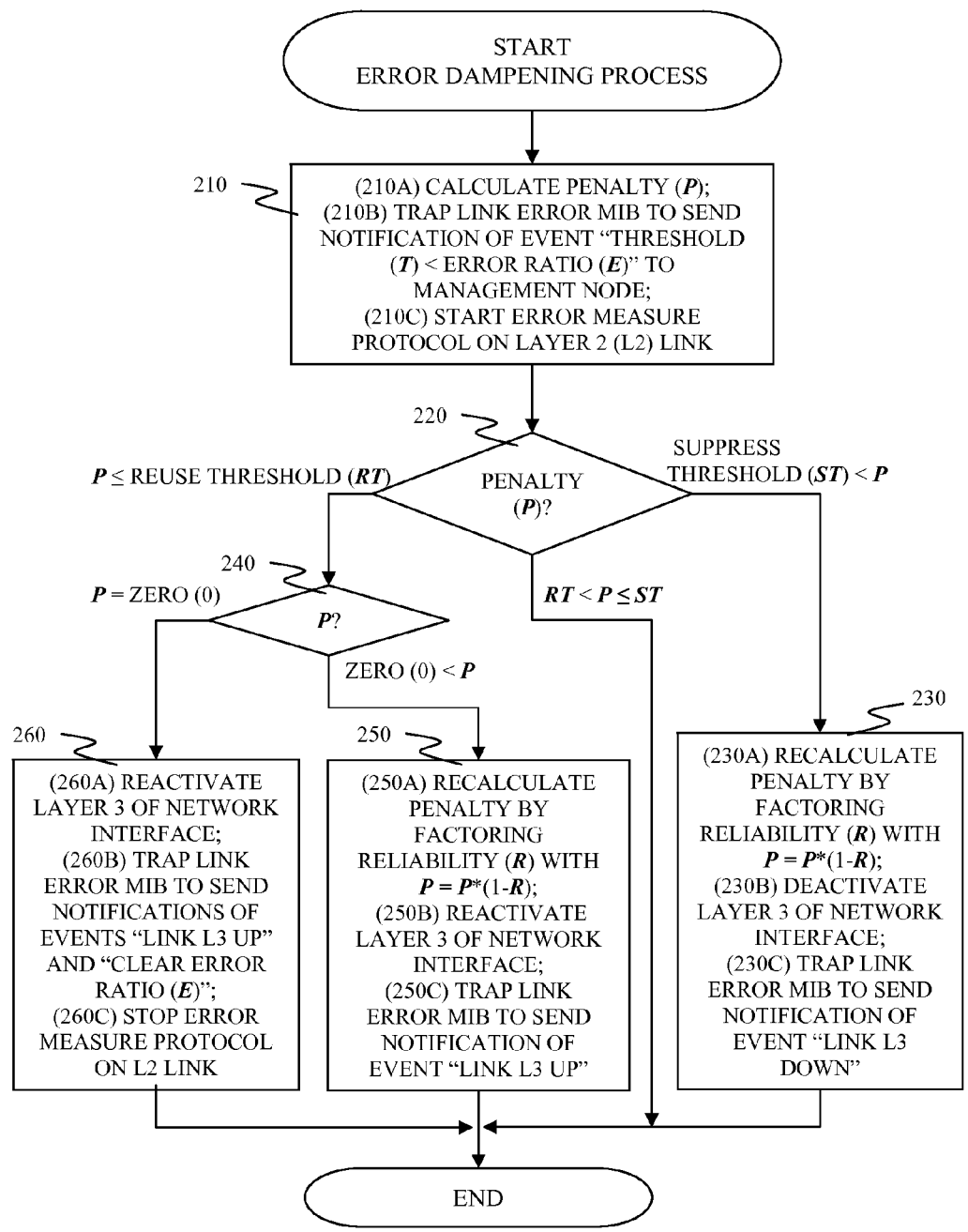
FIGS. 3 and 3A are flowcharts depicting a method for error dampening as performed by the network interface of the system of FIG. 1, in accordance with the embodiments of the present invention.

FIG. 3 is a flowchart depicting a method for error dampening as performed by the network interface of Node K of FIG. 1, supra, in accordance with the embodiments of the present invention.

In step 210, the error dampening process concurrently performs substeps 210A, 210B, and 210C. Then the error dampening process proceeds with step 220.

In substep 210A, the error dampening process calculates Penalty (P) of the network interface based on the values of Error ratio (E) and Reliability (R) from step 130 of FIG. 2 supra. In conventional mechanisms for suppressing flapping interfaces, penalty is a value assigned to a flapping interface, which increases with each flap and decreases over a specific time period referred to as the "half life." Contrastingly, in this specification, Penalty (P) calculation is formulated based on various factors affecting data traffic routing performances and performed when Error ratio (E) is greater than Threshold (T). In one embodiment of the present invention, Penalty (P) is calculated as:

$$P = \text{MaxPenalty} * (1-R),$$

wherein MaxPenalty is an upper bound of a value for P that is a positive number. See FIG. 5 infra for an example of step 210A.

In substep 210B, the error dampening process traps the link error MIB (LE) to send notification of Event "Threshold (T)<Error ratio (E)" to a management node. Consequently, the link error MIB (LE) module sends the event notification to the management node as directed. The management node operates same as in conventional network system in determining whether or not to propagate the received event to other nodes in the system. See the Request for Comments (RFC) 2863 for detailed definitions of conventional trap mechanism.

In substep 210C, the error dampening process starts running the error measure protocol on Layer 2 (L2) link. The error measure protocol utilizes Echo/Reply data exchanges with a neighboring node to check Error ratio (E) and Reliability (R) over L2 link of the network interface. The error measure protocol continues monitoring L2 link of the network interface while Penalty (P) is greater than zero (0).

In another embodiment, the error measure protocol on L2 link is started by the network interface prior to step 210 of the error dampening process. See descriptions of FIGS. 4, 5, and 6, infra, for another embodiment of the present invention.

In step 220, the error dampening process determines where Penalty (P) falls in one of three ranges separated by two threshold values of Suppress Threshold (ST) and Reuse Threshold (RT). If the error dampening process determines that Penalty (P) is greater than Suppress Threshold (ST), that is, (ST<P), then the error dampening process proceeds with step 230. If the error dampening process determines that Penalty (P) is less than or equal to Reuse Threshold (RT), that is, (P≤RT), then the error dampening process proceeds with step 240. If the error dampening process determines that Penalty (P) is greater than Reuse Threshold (RT) and less than or equal to Suppress Threshold (ST), that is, (RT<P≤ST), then the error dampening process terminates and the network interface loops back to step 120 of FIG. 2 supra for next error calculation interval because Penalty (P) of the network interface is acceptable and the network interface is deemed reliable enough to continue participating in routing of the system.

In this specification, terms "suppress threshold" and "reuse threshold" are used in context of conventional network terminology. Accordingly, Suppress Threshold (ST) is defined as a first preconfigured value of Penalty (P) that triggers the node to suppress the network interface as flapping. By the same token, Reuse Threshold (RT) is defined as a second preconfigured value of Penalty (P) that triggers the node to make the network interface available as being reliable enough. By definition of terms, both Suppress Threshold (ST) and Reuse Threshold (RT) are positive numbers, and Suppress Threshold (ST) must be much greater than Reuse Threshold (RT), that is (RT<<ST). Such requirements are set forth in steps 220 and 240 infra as a two-step determination of an order among Penalty (P), Suppress Threshold (ST), Reuse Threshold (RT), and zero (0). See descriptions of FIG. 5 infra for exemplary values configured for Suppress Threshold (ST) and Reuse Threshold (RT).

In step 230, the error dampening process concurrently performs substeps 230A, 230B, and 230C, for a condition (ST<P). Then the error dampening process terminates and the network interface loops back to step 120 of FIG. 2 supra for next interval for error ratio calculation.

In substep 230A, the error dampening process recalculates Penalty (P) by factoring Reliability (R) as P=P*(1−R), based on Error ratio (E) measured by the error measure protocol. Since the error measure protocol started running from step 210C for the Layer 2 (L2) link, Error ratio (E) of the network interface has been changed according to new data traffic.

In substep 230B, the error dampening process deactivates Layer 3 (L3) link of the network interface. In this specification, the terms "deactivate" is defined as to stop using Layer 3 (L3) link of the network interface while Layer 2 (L2) is still active, as opposed to the term "suppress" that indicates, in conventional event dampening mechanism, shutting down all layers of the network interface.

In substep 230C, the error dampening process traps the link error MIB (LE) to send a notification of Event "Link L3 Down" to a management node of the system such that the local node would not receive incoming data traffic for routing. As noted, once Layer 3 (L3) link is deactivated from step 230C, the local node does not perform Layer 3 (L3) functionalities which are required by most of routing protocols.

In step 240, the error dampening process determines if Penalty (P) is greater than zero (0). If the error dampening process determines that Penalty (P) is greater than zero (0), then the error dampening process proceeds with step 250. If the error dampening process determines that Penalty (P) is equal to zero (0), then the error dampening process proceeds with step 260.

In step 250, the error dampening process concurrently performs substeps 250A, 250B, and 250C, for a condition (0<P≤RT). Then the error dampening process terminates and the network interface loops back to step 120 of FIG. 2 supra for next interval for error ratio calculation.

In substep 250A, the error dampening process recalculates Penalty (P) by factoring Reliability (R) as P=P*(1−R), based on Error ratio (E) measured by the error measure protocol.

In substep 250B, the error dampening process reactivates Layer 3 (L3) link of the network interface. In this specification, the terms "reactivate" is defined as to resume using the deactivated Layer 3 (L3) link of the network interface, as opposed to the term "reuse" that indicates, in conventional event dampening mechanism, reinstating all layers of the suppressed network interface.

In substep 250C, the error dampening process traps the link error MIB (LE) to send a notification of Event "Link L3 Up" to a management node of the system such that the local node would participate in routing in the system.

In step 260, the error dampening process concurrently performs substeps 260A, 260B, and 260C, for a condition (P=0). Then the error dampening process terminates and the network interface loops back to step 120 of FIG. 2 supra for next interval for error ratio calculation.

In substep 260A, the error dampening process reactivates Layer 3 (L3) link of the network interface.

In substep 260B, the error dampening process traps the link error MIB (LE) to send notifications of Event "Clear Error Ratio" to reset Error ratio (E) and Event "Link L3 Up".

In substep 260C, the error dampening process stops the error measure protocol on Layer 2 (L2) link that had been started running from step 210C.

Figure 3A:
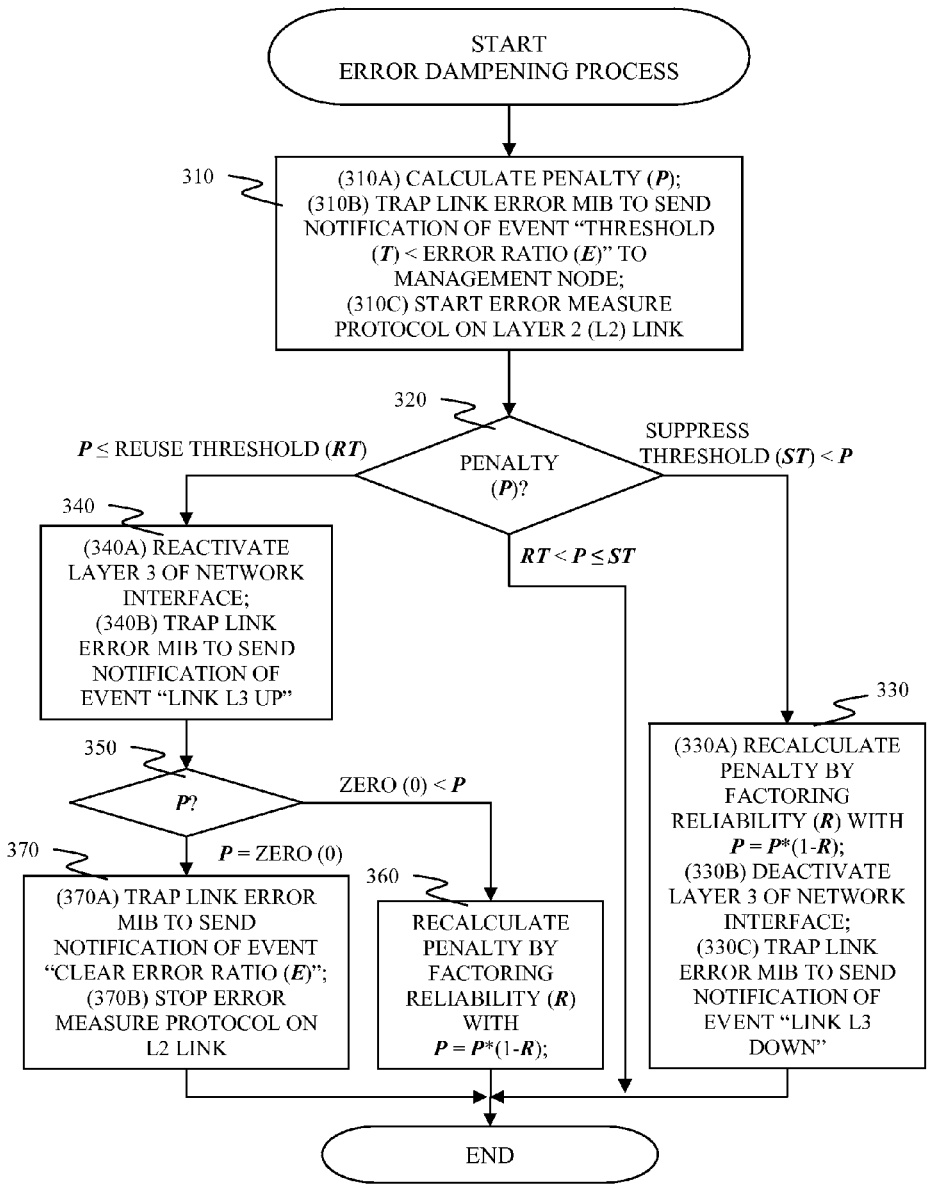

FIG. 3A is a flowchart depicting a method for error dampening as performed by the network interface of Node K of FIG. 1, supra, in accordance with the embodiments of the present invention.

In step 310, the error dampening process concurrently performs substeps 310A, 310B, and 310C. Then the error dampening process proceeds with step 320.

In substep 310A, the error dampening process calculates Penalty (P) of the network interface based on the values of Error ratio (E) and Reliability (R) from step 130 of FIG. 2 supra. In conventional mechanisms for suppressing flapping interfaces, penalty is a value assigned to a flapping interface, which increases with each flap and decreases over a specific time period referred to as the "half life." Contrastingly, in this specification, Penalty (P) calculation is formulated based on various factors affecting data traffic routing performances and performed when Error ratio (E) is greater than Threshold (T). In one embodiment of the present invention, Penalty (P) is calculated as:

$$P=\text{MaxPenalty}*(1-R),$$

wherein MaxPenalty is an upper bound of a value for P that is a positive number. See FIG. 5 infra for an example of step 310A.

In substep 310B, the error dampening process traps the link error MIB (LE) to send notification of Event "Threshold (T)<Error ratio (E)" to a management node. Consequently, the link error MIB (LE) module sends the event notification to the management node as directed. The management node operates same as in conventional network system in determining whether or not to propagate the received event to other nodes in the system. See the Request for Comments (RFC) 2863 for detailed definitions of conventional trap mechanism.

In substep 310C, the error dampening process starts running the error measure protocol on Layer 2 (L2) link. The error measure protocol utilizes Echo/Reply data exchanges with a neighboring node to check Error ratio (E) and Reliability (R) over L2 link of the network interface. The error measure protocol continues monitoring L2 link of the network interface while Penalty (P) is greater than zero (0).

In another embodiment, the error measure protocol on L2 link is started by the network interface prior to step 310 of the error dampening process. See descriptions of FIGS. 4, 5, and 6, infra, for another embodiment of the present invention.

In step 320, the error dampening process determines where Penalty (P) falls in one of three ranges separated by two threshold values of Suppress Threshold (ST) and Reuse Threshold (RT). If the error dampening process determines that Penalty (P) is greater than Suppress Threshold (ST), that is, (ST<P), then the error dampening process proceeds with step 330. If the error dampening process determines that Penalty (P) is less than or equal to Reuse Threshold (RT), that is, (P≤RT), then the error dampening process proceeds with step 340. If the error dampening process determines that Penalty (P) is greater than Reuse Threshold (RT) and less than or equal to Suppress Threshold (ST), that is, (RT<P≤ST), then the error dampening process terminates and the network interface loops back to step 120 of FIG. 2 supra for next error calculation interval because Penalty (P) of the network interface is acceptable and the network interface is deemed reliable enough to continue participating in routing of the system.

In step 330, the error dampening process concurrently performs substeps 330A, 330B, and 330C, for a condition (ST<P). Then the error dampening process terminates and the network interface loops back to step 120 of FIG. 2 supra for next interval for error ratio calculation.

In substep 330A, the error dampening process recalculates Penalty (P) by factoring Reliability (R) as P=P*(1−R), based on Error ratio (E) measured by the error measure protocol. Since the error measure protocol started running from step 310C for the Layer 2 (L2) link, Error ratio (E) of the network interface has been changed according to new data traffic.

In substep 330B, the error dampening process deactivates Layer 3 (L3) link of the network interface. In this specification, the terms "deactivate" is defined as to stop using Layer 3 (L3) link of the network interface while Layer 2 (L2) is still active, as opposed to the term "suppress" that indicates, in conventional event dampening mechanism, shutting down all layers of the network interface.

In substep 330C, the error dampening process traps the link error MIB (LE) to send a notification of Event "Link L3 Down" to a management node of the system such that the local node would not receive incoming data traffic for routing. As noted, once Layer 3 (L3) link is deactivated from step 330C, the local node does not perform Layer 3 (L3) functionalities which are required by most of routing protocols.

In step 340, the error dampening process concurrently performs substeps 240A and 240B for a condition (0<P≤RT). Then the error dampening process terminates and the network interface loops back to step 120 of FIG. 2 supra for next interval for error ratio calculation.

In substep 340A, the error dampening process reactivates Layer 3 (L3) link of the network interface. In this specification, the terms "reactivate" is defined as to resume using the deactivated Layer 3 (L3) link of the network interface, as opposed to the term "reuse" that indicates, in conventional event dampening mechanism, reinstating all layers of the suppressed network interface.

In substep 340B, the error dampening process traps the link error MIB (LE) to send a notification of Event "Link L3 Up" to a management node of the system such that the local node would participate in routing in the system.

In step 350, the error dampening process determines if Penalty (P) is greater than zero (0). If the error dampening process determines that Penalty (P) is greater than zero (0), then the error dampening process proceeds with step 360. If the error dampening process determines that Penalty (P) is equal to zero (0), then the error dampening process proceeds with step 370.

In step 360, the error dampening process recalculates Penalty (P) by factoring Reliability (R) as P=P*(1−R), based on Error ratio (E) measured by the error measure protocol.

In step 370, the error dampening process concurrently performs substeps 370A and 370B for a condition (P=0). Then the error dampening process terminates and the network interface loops back to step 120 of FIG. 2 supra for next interval for error ratio calculation.

In substep 370A, the error dampening process traps the link error MIB (LE) to send a notification of Event "Clear Error Ratio" to reset Error ratio (E).

In substep 370B, the error dampening process stops the error measure protocol on Layer 2 (L2) link that had been started running from step 310C.

FIGS. 4, 5, and 6 illustrate an embodiment of the system for dynamic routing based on reliability evaluation of FIG. 1 supra.

FIG. 4 illustrates one embodiment of the network interface performing the method for dynamic error dampening according to the flowchart of FIG. 2 supra.

In lines L101 through L104, the network interface retrieves traffic statistics from the link error MIB (LE) at Time(T1), in accordance with step 120 of FIG. 2 supra.

In lines L105 through L111, the network interface calculates Error Ratio (E) based on the traffic statistics at Time (T1) and prior traffic statistics at Time (T0), content of the link in accordance with step 130 of FIG. 2 supra., wherein Time (T1−T0) is a configurable interval for error ratio calculation.

In lines L112 through L115, the network interface stores current traffic statistics at Time (T1) as the prior traffic statistics at Time (T0) for a next error calculation.

In lines L116 through L124, the network interface determines a next operation based on a value of Error Ratio (E). When ErrorRatio≤1%, shown in lines L116-7, the network interface assigns Penalty (P) as zero (0), and proceeds with the next error calculation. When 1%<ErrorRatio, shown in lines L118-L124, the network interface assigns a respective Reliability (R) based on a value range of Error ratio (E), traps the link error MIB to send notification of Event AlarmLinkError, starts running the error measure protocol, and proceeds with the error dampening process.

In this embodiment of the present invention, the link error MIB (LE) comprises event notification modules for events selected from {AlarmLinkError, LinkL3Up, LinkL3Down, ClearAlarmLinkError}, wherein Event AlarmLinkError represents a first condition (Threshold (T)<Error Ratio (E)), wherein Event LinkL3Up represents that the deactivated Layer 3 link changes state to activated, wherein Event LinkL3Down represents that the activated Layer 3 link changes state to deactivated, and wherein Event ClearAlarmLinkError represents that the network interface is error-free. When the link error MIB (LE) is trapped to send a respective event, the link error MIB (LE) sends a notification for the respective event to a management node such that the system dynamically reroutes data traffic factoring in reliability of the network interface embodiment shown in FIG. 4.

FIG. 5 illustrates one embodiment of the error dampening process performed by the network interface embodiment of FIG. 4 supra. See descriptions of steps in FIG. 3 supra for operations of this embodiment.

Step 230 of FIG. 3 supra corresponds to lines L210 through L212. Step 250 of FIG. 3 supra corresponds to lines L215 through L220. Step 260 of FIG. 3 supra corresponds to lines L223 and L224.

FIG. 6 illustrates one embodiment of the error measure protocol over Layer 2 (L2) link process performed by the network interface embodiment of FIG. 4 supra. See descriptions of step 210C in FIG. 3 supra for operations of this embodiment.

In line L303, a value of X is configured between 10 and 1000, which is an interval for Echo/Reply function over L2 link.

Figure 7:
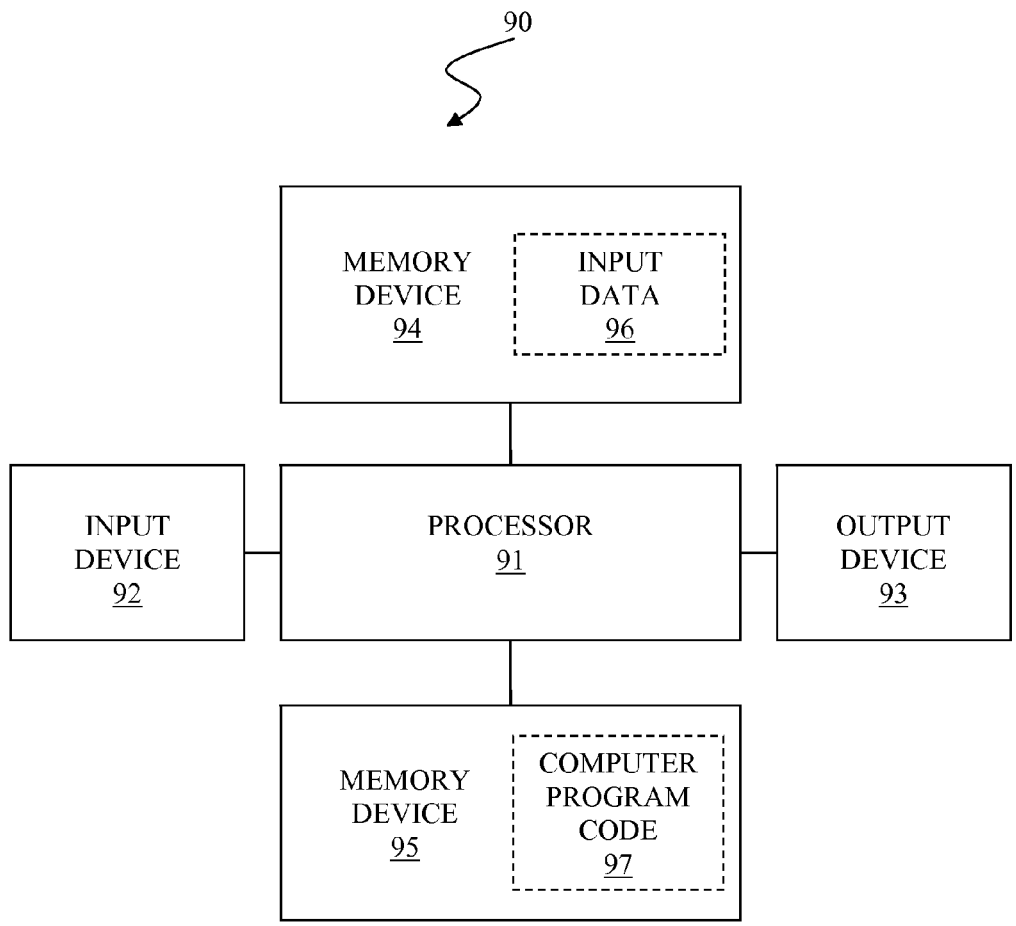
FIG. 7 illustrates a computer system used for dynamic routing based on evaluation of network interface reliability, in accordance with the embodiments of the present invention.

FIG. 7 illustrates a computer system 90 used for dynamic routing based on evaluation of network interface reliability, in accordance with the embodiments of the present invention.

The computer system 90 comprises a processor 91, an input device 92 coupled to the processor 91, an output device 93 coupled to the processor 91, and memory devices 94 and 95 each coupled to the processor 91. In this specification, the computer system 90 represents any type of programmable data processing apparatus.

The input device 92 is utilized to receive input data 96 into the computer system 90. The input device 92 may be, inter alia, a keyboard, a mouse, a keypad, a touch screen, a scanner, a voice recognition device, a sensor, a network interface card (NIC), a Voice/video over Internet Protocol (VOIP) adapter, a wireless adapter, a telephone adapter, a dedicated circuit adapter, etc. The output device 93 is utilized to communicate results generated by the computer program code 97 to a user of the computer system 90. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

Any of the components of the present invention can be deployed, managed, serviced, etc. by a service provider that offers to deploy or integrate computing infrastructure with respect to a process for dynamic routing based on evaluation of network interface reliability of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for dynamic routing based on evaluation of network interface reliability.

In another embodiment, the invention provides a method that performs the process steps of the invention on a subscription, advertising and/or fee basis. That is, a service provider, such as a Solution Integrator, can offer to create, maintain, support, etc., a process for dynamic routing based on evaluation of network interface reliability of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. In this specification, the term "memory device" 94, 95 represent a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code 97 for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer program code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer program code" 97 in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for dynamic error dampening in a node of a network system, said method comprising:
    retrieving, by a processor of a computer system, statistics of data traffic of data packets at the node;
    said processor computing an error ratio (E) based on the retrieved statistics such that $0 \leq E \leq 1$;
    said processor determining that the computed error ratio exceeds a specified error ratio threshold; and
    in response to said determining that the computed error ratio exceeds the specified error ratio threshold, said processor implementing an error dampening process at the node,
    wherein data traffic of the node is implemented in accordance with an Open Systems Interconnection (OSI) network management model that includes a Layer 1 physical link, a Layer 2 link comprising a data link in which primitive point-to-point data communication with neighboring nodes is enabled upon the Layer 1 physical link, and a Layer 3 link which is a network link operating on top of the Layer 2 link, and
    wherein said implementing the error dampening process at the node comprises deactivating the Layer 3 link of the node while monitoring data traffic over the Layer 2 link of the node, said deactivating the Layer 3 link of the node comprising preventing the Layer 3 Link of the node from receiving incoming data traffic arriving at the node after initiation of said implementing the error dampening process at the node and from routing the incoming data traffic to other nodes in the network system.

2. The method of claim 1,
    wherein the statistics of data traffic comprises statistics of: a number of erred incoming data packets at the node, a total number of incoming data packets at the node, a number of erred outgoing data packets at the node, and a total number of outgoing data packets at the node.

3. The method of claim 2, wherein said computing the error ratio (E) comprises:
    computing ErrorRatioIn as a ratio of a change in the number of erred incoming data packets at the node from a previous time to a current time to a change in the total number of incoming data packets at the node from the previous time to the current time;
    computing ErrorRatioOut as a ratio of a change in the number of erred outgoing data packets at the node from the previous time to the current time to a change in the total number of outgoing data packets at the node from the previous time to the current time; and
    computing E as a maximum of ErrorRatioIn and ErrorRatioOut.

4. The method of claim 2, wherein said implementing the error dampening process at the node further comprises:
    computing a reliability (R) based on E such that $0 \leq R \leq 1$, wherein $R=1$ if $E=0$, $R=0$ if $E=1$, and $dR/dE \leq 0$ if $0 < E < 1$;
    after said computing the reliability (R), computing a penalty (P) as $(MaxPenalty*(1-R))$;
    determining that the computed penalty (P) exceeds a specified suppress threshold,
    wherein said deactivating the Layer 3 link of the node while monitoring data traffic over the Layer 2 link of the node is initiated in response to said determining that the computed penalty (P) exceeds the specified suppress threshold, and wherein MaxPenalty is a preconfigured upper bound of the Penalty (P).

5. The method of claim 4, wherein said implementing the error dampening process at the node further comprises:

after initiation of said deactivating the Layer 3 link of the node while monitoring data traffic over the Layer 2 link of the node, recomputing the penalty (P) according to $P=P*(1-R)$;

after said recomputing the penalty (P), determining that the recomputed penalty (P) does not exceed a resuse threshold such that the resuse threshold is less than the suppress threshold;

in response to said determining that the recomputed penalty (P) does not exceed the resuse threshold, reactivating the Layer 3 link of the node enables the Layer 3 Link of the node to receive incoming data traffic for routing to the other nodes in the network system.

6. The method of claim 5, wherein said implementing the error dampening process at the node further comprises:

after said reactivating the Layer 3 link of the node, ascertaining whether the recomputed penalty (P) exceeds zero or is equal to zero;

if said ascertaining ascertains that the recomputed penalty (P) exceeds zero, then recalculating the penalty (P) according to $P=P*(1-R)$;

if said ascertaining ascertains that the recomputed penalty (P) exceeds zero, then clearing the error ratio (E).

7. A computer program product, comprising a computer readable hardware storage device having computer readable program code stored therein, said program code upon being executed by a processor of a computer system implements a method for dynamic error dampening in a node of a network system, said method comprising:

said processor retrieving statistics of data traffic of data packets at the node;

said processor computing an error ratio (E) based on the retrieved statistics such that $0 \leq E \leq 1$;

said processor determining that the computed error ratio exceeds a specified error ratio threshold; and in response to said determining that the computed error ratio exceeds the specified error ratio threshold, said processor implementing an error dampening process at the node, wherein data traffic of the node is implemented in accordance with an Open Systems Interconnection (OSI) network management model that includes a Layer 1 physical link, a Layer 2 link comprising a data link in which primitive point-to-point data communication with neighboring nodes is enabled upon the Layer 1 physical link, and a Layer 3 link which is a network link operating on top of the Layer 2 link, and wherein said implementing the error dampening process at the node comprises deactivating the Layer 3 link of the node while monitoring data traffic over the Layer 2 link of the node, said deactivating the Layer 3 link of the node comprising preventing the Layer 3 Link of the node from receiving incoming data traffic arriving at the node after initiation of said implementing the error dampening process at the node and from routing the incoming data traffic to other nodes in the network system.

8. The computer program product of claim 7, wherein the statistics of data traffic comprises statistics of: a number of erred incoming data packets at the node, a total number of incoming data packets at the node, a number of erred outgoing data packets at the node, and a total number of outgoing data packets at the node.

9. The computer program product of claim 8, wherein said computing the error ratio (E) comprises:

computing ErrorRatioIn as a ratio of a change in the number of erred incoming data packets at the node from a previous time to a current time to a change in the total number of incoming data packets at the node from the previous time to the current time;

computing ErrorRatioOut as a ratio of a change in the number of erred outgoing data packets at the node from the previous time to the current time to a change in the total number of outgoing data packets at the node from the previous time to the current time; and computing E as a maximum of ErrorRatioIn and ErrorRatioOut.

10. The computer program product of claim 8, wherein said implementing the error dampening process at the node further comprises:

computing a reliability (R) based on E such that $0 \leq R \leq 1$, wherein $R=1$ if $E=0$, $R=0$ if $E=1$, and $dR/dE \leq 0$ if $0<E<1$;

after said computing the reliability (R), computing a penalty (P) as (MaxPenalty*(1−R));

determining that the computed penalty (P) exceeds a specified suppress threshold, wherein said deactivating the Layer 3 link of the node while monitoring data traffic over the Layer 2 link of the node is initiated in response to said determining that the computed penalty (P) exceeds the specified suppress threshold, and wherein MaxPenalty is a preconfigured upper bound of the Penalty (P).

11. The computer program product of claim 10, wherein said implementing the error dampening process at the node further comprises:

after initiation of said deactivating the Layer 3 link of the node while monitoring data traffic over the Layer 2 link of the node, recomputing the penalty (P) according to $P=P*(1-R)$;

after said recomputing the penalty (P), determining that the recomputed penalty (P) does not exceed a resuse threshold such that the resuse threshold is less than the suppress threshold;

in response to said determining that the recomputed penalty (P) does not exceed the resuse threshold, reactivating the Layer 3 link of the node enables the Layer 3 Link of the node to receive incoming data traffic for routing to the other nodes in the network system.

12. A computer system comprising a processor, a memory coupled to the processor, and a computer readable hardware storage device coupled to the processor, said storage device containing program code which, upon being executed by the processor via the memory, implements a method for dynamic error dampening in a node of a network system, said method comprising:

said processor retrieving statistics of data traffic of data packets at the node;

said processor computing an error ratio (E) based on the retrieved statistics such that $0 \leq E \leq 1$;

said processor determining that the computed error ratio exceeds a specified error ratio threshold; and in response to said determining that the computed error ratio exceeds the specified error ratio threshold, said processor implementing an error dampening process at the node, wherein data traffic of the node is implemented in accordance with an Open Systems Interconnection (OSI) network management model that includes a Layer 1 link of the node, a Layer 2 link of the node, and a Layer 3 link of the node, wherein data traffic of the node is implemented in accordance with an Open Systems Interconnection (OSI) network management model that includes a Layer 1 physical link, a Layer 2 link comprising a data link in which primitive point-to-point data communication with neighboring nodes is enabled upon the Layer 1 physical link, and a Layer 3 link which is a network link operating on top of the Layer 2 link, and wherein said implementing the error dampening process at the node comprises deactivating the Layer 3 link of the node while monitoring data traffic over the Layer 2 link of the node, said deactivating the Layer 3 link of the node comprising preventing the Layer 3 Link of the node from receiving incoming data traffic arriving at the node after initiation of said implementing the error dampening process at the node and from routing the incoming data traffic to other nodes in the network system.

13. The computer system of claim 12, wherein the statistics of data traffic comprises statistics of: a number of erred incoming data packets at the node, a total number of incoming data packets at the node, a number of erred outgoing data packets at the node, and a total number of outgoing data packets at the node.

14. The computer system of claim 13, wherein said computing the error ratio (E) comprises:

computing ErrorRatioIn as a ratio of a change in the number of erred incoming data packets at the node from a previous time to a current time to a change in the total number of incoming data packets at the node from the previous time to the current time;

computing ErrorRatioOut as a ratio of a change in the number of erred outgoing data packets at the node from the previous time to the current time to a change in the total number of outgoing data packets at the node from the previous time to the current time; and computing E as a maximum of ErrorRatioIn and ErrorRatioOut.

15. The computer system of claim 13, wherein said implementing the error dampening process at the node further comprises:

computing a reliability (R) based on E such that $0 \leq R \leq 1$, wherein R=1 if E=0, R=0 if E=1, and $dR/dE \leq 0$ if $0<E<1$;

after said computing the reliability (R), computing a penalty (P) as (MaxPenalty*(1−R));

determining that the computed penalty (P) exceeds a specified suppress threshold, wherein said deactivating the Layer 3 link of the node while monitoring data traffic over the Layer 2 link of the node is initiated in response to said determining that the computed penalty (P) exceeds the specified suppress threshold, and wherein MaxPenalty is a preconfigured upper bound of the Penalty (P).

16. The computer system of claim 15, wherein said implementing the error dampening process at the node further comprises:

after initiation of said deactivating the Layer 3 link of the node while monitoring data traffic over the Layer 2 link of the node, recomputing the penalty (P) according to P=P*(1−R);

after said recomputing the penalty (P), determining that the recomputed penalty (P) does not exceed a resuse threshold such that the resuse threshold is less than the suppress threshold;

in response to said determining that the recomputed penalty (P) does not exceed the resuse threshold, reactivating the Layer 3 link of the node enables the Layer 3 Link of the node to receive incoming data traffic for routing to the other nodes in the network system.

17. A process for supporting computer infrastructure, said process comprising integrating computer-readable program code into a computer system, wherein said integrating comprises storing the program code in a computer readable hardware storage device of the computer system through use of a processor of the computer system, and wherein the program code, upon being executed by the processor, implements a method for dynamic error dampening in a node of a network system, said method comprising:

said processor retrieving statistics of data traffic of data packets at the node;

said processor computing an error ratio (E) based on the retrieved statistics such that 0 E≤1;

said processor determining that the computed error ratio exceeds a specified error ratio threshold; and in response to said determining that the computed error ratio exceeds the specified error ratio threshold, said processor implementing an error dampening process at the node, wherein data traffic of the node is implemented in accordance with an Open Systems Interconnection (OSI) network management model that includes a Layer 1 link of the node, a Layer 2 link of the node, and a Layer 3 link of the node, wherein data traffic of the node is implemented in accordance with an Open Systems Interconnection (OSI) network management model that includes a Layer 1 physical link, a Layer 2 link comprising a data link in which primitive point-to-point data communication with neighboring nodes is enabled upon the Layer 1 physical link, and a Layer 3 link which is a network link operating on top of the Layer 2 link, and wherein said implementing the error dampening process at the node comprises deactivating the Layer 3 link of the node while monitoring data traffic over the Layer 2 link of the node, said deactivating the Layer 3 link of the node comprising preventing the Layer 3 Link of the node from receiving incoming data traffic arriving at the node after initiation of said implementing the error dampening process at the node and from routing the incoming data traffic to other nodes in the network system.

18. The process of claim 17, wherein the statistics of data traffic comprises statistics of: a number of erred incoming data packets at the node, a total number of incoming data packets at the node, a number of erred outgoing data packets at the node, and a total number of outgoing data packets at the node.

19. The process of claim 18, wherein said implementing the error dampening process at the node further comprises:

computing a reliability (R) based on E such that $0 \leq R \leq 1$, wherein R=1 if E=0, R=0 if E=1, and $dR/dE \leq 0$ if $0<E<1$;

after said computing the reliability (R), computing a penalty (P) as (MaxPenalty*(1−R));

determining that the computed penalty (P) exceeds a specified suppress threshold, wherein said deactivating the Layer 3 link of the node while monitoring data traffic over the Layer 2 link of the node is initiated in response to said determining that the computed penalty (P) exceeds the specified suppress threshold, and wherein MaxPenalty is a preconfigured upper bound of the Penalty (P).

20. The process of claim 19, wherein said implementing the error dampening process at the node further comprises:
- after initiation of said deactivating the Layer 3 link of the node while monitoring data traffic over the Layer 2 link of the node, recomputing the penalty (P) according to $P=P*(1-R)$;
- after said recomputing the penalty (P), determining that the recomputed penalty (P) does not exceed a resuse threshold such that the resuse threshold is less than the suppress threshold;
- in response to said determining that the recomputed penalty (P) does not exceed the resuse threshold, reactivating the Layer 3 link of the node enables the Layer 3 Link of the node to receive incoming data traffic for routing to the other nodes in the network system.

\* \* \* \* \*